United States Patent [19]
Kimura

[11] Patent Number: 5,596,417
[45] Date of Patent: Jan. 21, 1997

[54] COLOR SIGNAL PROCESSOR FOR INVERTING R-Y AXIS OF CHROMINANCE SIGNAL

[75] Inventor: Ichiro Kimura, Kawasaki, Japan

[73] Assignee: Kabushiki Kaisha Toshiba, Kawasaki, Japan

[21] Appl. No.: 352,031

[22] Filed: Nov. 30, 1994

[30] Foreign Application Priority Data

Nov. 30, 1993 [JP] Japan .................................. 5-299628

[51] Int. Cl.$^6$ .............................. H04N 9/79; H04N 5/21
[52] U.S. Cl. ................................ 386/17; 348/630; 386/1
[58] Field of Search ................................ 358/310, 328, 358/329, 320, 324, 319, 327, 335; 348/662, 663, 665, 659, 571, 630, 713; 360/32, 33.1

[56] References Cited

U.S. PATENT DOCUMENTS

| | | | |
|---|---|---|---|
| 4,605,951 | 8/1986 | Kuribayashi | 348/662 |
| 4,933,748 | 6/1990 | Katsuki et al. | 348/662 |
| 5,153,741 | 10/1992 | Matsuo et al. | 358/328 |

OTHER PUBLICATIONS

"Hitachi Hyoron" vol. 74, No. 3 (1992-3) p. 277.

Primary Examiner—Thai G. Tran
Assistant Examiner—Robert Chevalier
Attorney, Agent, or Firm—Oblon, Spivak, McClelland, Maier & Neustadt, P.C.

[57] ABSTRACT

A color signal processor in which a color subcarrier is multiplied with either a signal harmonic or a phase shifted harmonic of a low frequency chrominance signal, depending on whether the R-Y axis of the chrominance signal is inverted. Band pass filtering extracts an arithmetic carrier signal resulting from the multiplication. The low frequency chrominance signal is multiplied by the extracted arithmetic carrier, and band pass filtering removes both upper and lower side band components generated in accordance with the low frequency chrominance signal multiplication. Various configurations of the above invention eliminate the need for a circuit inverting the R-Y axis, simplifying the structure of color signal processors and related devices. In addition, since no resonating circuit is used, the invention can be effectively implemented in an integrated circuit.

11 Claims, 11 Drawing Sheets

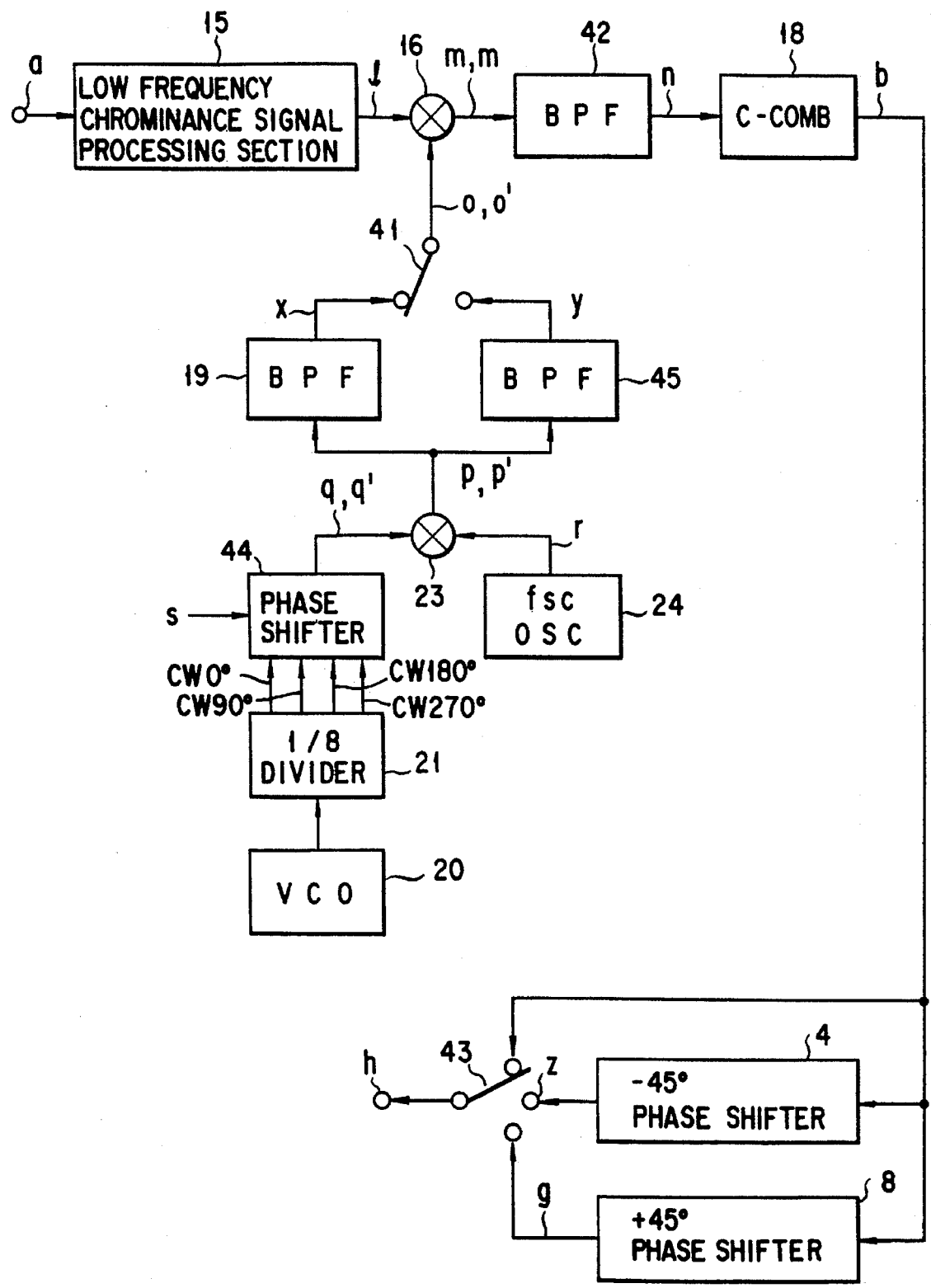
F I G. 1

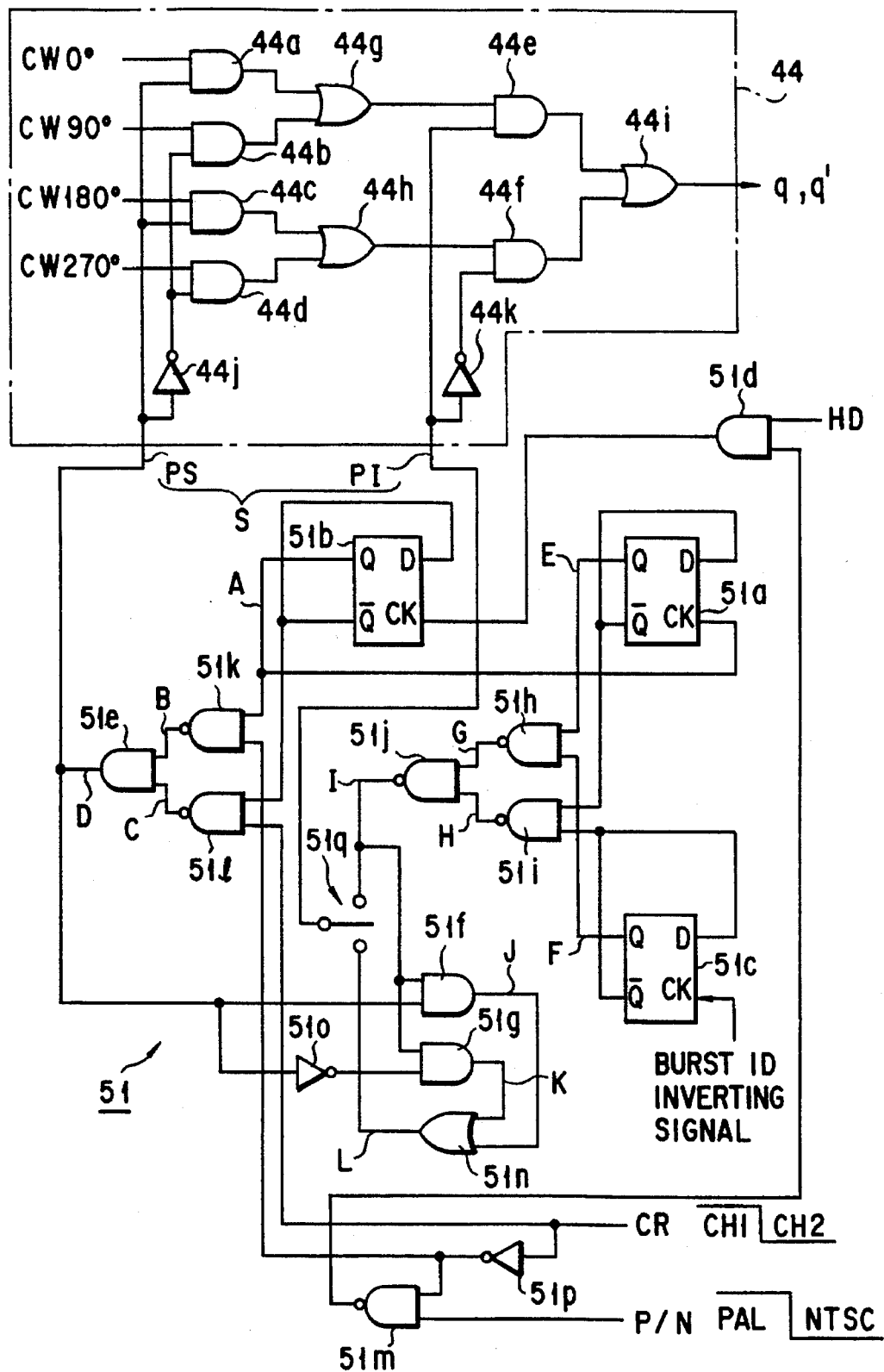
F I G. 5

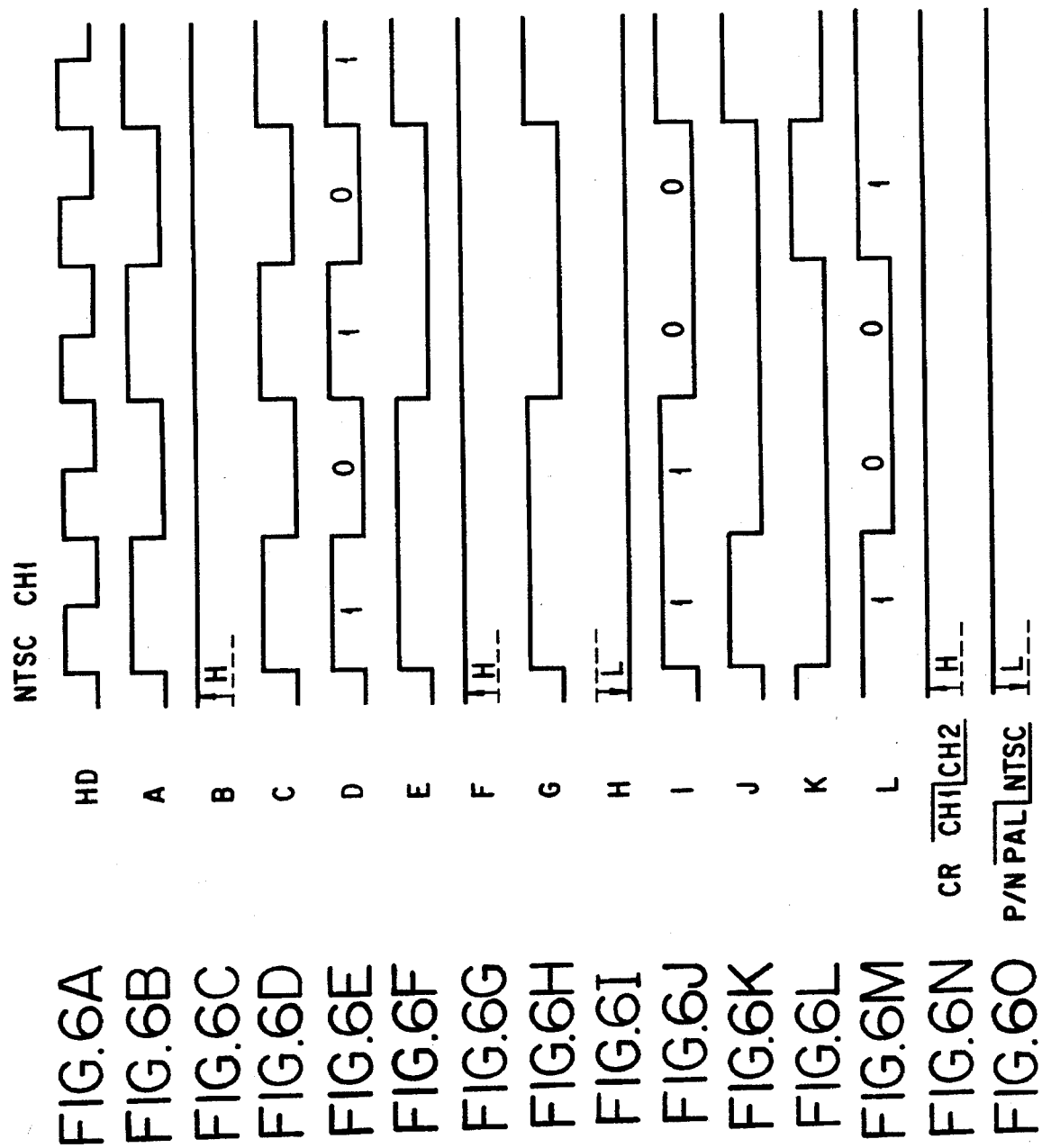

NTSC → PAL (CH1)

|   |    | 1H | 2H  | 3H   | 4H  | 5H |
|---|----|----|-----|------|-----|----|
| S | PS | 1  | 0   | 1    | 0   | 1  |
|   | PI | 1  | 0   | 0    | 1   | 1  |
| $q, q'$ |  | 0° | 270° | 180° | 90° | 0° |

NTSC → PAL (CH2)

|   |    | 1H  | 2H   | 3H   | 4H  | 5H  |
|---|----|-----|------|------|-----|-----|
| S | PS | 0   | 1    | 0    | 1   | 0   |
|   | PI | 1   | 0    | 0    | 1   | 1   |
| $q, q'$ |  | 90° | 180° | 180° | 90° | 90° |

COLOR SIGNAL PROCESSOR FOR INVERTING R-Y AXIS OF CHROMINANCE SIGNAL

BACKGROUND OF THE INVENTION

1. Field of the Invention

The present invention relates to an image signal processing applied to video tape recorder (hereinafter called as VTR), which is capable of reproducing a magnetic tape to which the image signal is recorded by a PAL format and an NTSC format, and more particularly to a color signal processor for inverting an R-Y axis of a chrominance signal.

2. Description of the Related Art

FIG. 11 shows a color signal processor of a conventional VTR disclosed in "Hitach Hyoron" Vol. 74 No. 3 (1992–3) p.277. An image signal recorded to a magnetic tape 1 is read by a magnetic head 2, and supplied to a color signal reproduction processor 3. One chrominance signal reproduced by the color signal reproduction processor 3 is directly supplied to a switch 5, and the other Chrominance signal is supplied to the switch 5 through a phase shifter 4. The phase shifter 4 shifts only a phase of a color burst signal on a color orthogonal two phase coordinate at −45°. One output of the switch 5 is directly supplied to a switch 7, and the other output is supplied to the switch 7 through an R-Y axis inverting section 6. The R-Y axis inverting section 6 inverts the R-Y axis on the color orthogonal two phase coordinate, thereby inverting the color signal. One output signal of the switch 7 is directly supplied to a switch 9, and the other output signal is supplied to a switch 9 through a phase shifter 8. The phase shifter 8 shifts only the phase of the color burst signal on the color orthogonal two phase coordinate at +45°. The switches 5, 7, and 9 are suitably changed in the following three cases:

(1) A case in which an image signal recorded by the PAL format is converted to an image signal recorded by the NTSC format (hereinafter called as PAL→NTSC conversion).

(2) A case in which an image signal recorded by the NTSC format is converted to an image signal recorded by the PAL format (hereinafter called as NTSC→PAL conversion).

(3) A case in which a skew generated when an image signal recorded by the PAL format is reproduced at a multiple speed (hereinafter called as PAL special reproduction).

FIGS. 12 to 14 show a signal of each section of the color signal processor. FIG. 12 shows the process of correcting the skew generated by a track jump every 1 H. In this case, the switch 5 always selects a signal b, the switch 7 alternately selects signals d and e every 1 H, and the switch 9 always selects a signal f.

FIG. 13 shows the process of the PAL→NTSC conversion every 1 H. In this case, the switch 5 always selects the signal b, the switch 7 alternately selects the signals d and e every 1 H, and the switch 9 always selects a signal g.

FIG. 14 shows the process of the NTSC→PAL conversion every 1 H. In this case, the switch 5 always selects a signal c, the switch 7 alternately selects the signals d and e every 1 H, and the switch 9 always selects the signal f.

FIG. 15 specifically shows the R-Y axis inverting section 6 and the switch 7. The R-Y axis inverting section 6 comprises a multiplier 12 and a frequency multiplier 13. The multiplier 12 multiplies the input signal d and an arithmetic carrier signal i together. The frequency multiplier 13 multiplies a frequency of a color subcarrier twice. The switch 7 comprises a switch 10 and a low pass filter (LPF) 11.

As an input signal d, a signal wherein amplitude is A and a phase angle θ to an angle frequency $\omega_{SC}$ corresponding to a frequency $f_{SC}$ of the color subcarrier is provided will be considered as follows.

More specifically, the input signal d can be expressed as the following equation (1).

$$d = A \sin(\omega_{SC} t + \theta) \quad (1)$$

In this case, $\omega_{SC} = \frac{1}{2} \pi f_{SC}$. It is noted that amplitude are expressed by capital letters A to H in the following signals.

The arithmetic carrier signal i inputted to the multiplier 12 shown in FIG. 15 can be expressed as the following equation (2).

$$i = -2 \cos 2\omega_{SC} t \quad (2)$$

In this case, the output signal e of the multiplier 12 can be expressed as the following equation (3).

$$\begin{aligned} e &= d \times i \\ &= A\sin(\omega_{SC}t - \theta) - A\sin(3\omega_{SC}t + \theta) \end{aligned} \quad (3)$$

When the switch 10, which is used to perform a color arrangement shown in FIG. 15, selects the signal e, the LPF 11 extracts a first term of the equation (3) as the output signal f. The output signal f can be expressed as the following equation (4).

$$f = A \sin(\omega_{SC} t - \theta) \quad (4)$$

Regarding the signal f expressed by the equation (4), the signal d shown in FIG. 16 is defined by +θ ("+" shows an anticlockwise direction) to B-Y axis, and the signal f shown in FIG. 17 is defined by −θ ("−" shows a clockwise direction) to B-Y axis.

When the switch 10 selects d as an output signal k, the signal d shown by the equation (1) can be obtained as the output f of the filter 11. Therefore, the processes d→e→f shown in FIGS. 12, 13, and 14 can be realized by changing the switch 7.

FIG. 18 specifically shows the color signal reproduction processor 3.

In FIG. 18, a reproduced image signal a is supplied to a low chrominance signal processor 15. The low chrominance signal processor 15 removes an unnecessary component of a chrominance signal whose frequency is converted to a low frequency outputted from the magnetic head. The low chrominance signal processor 15 sets amplitude of the chrominance signal to a certain reference level, and supplies the chrominance signal to one input side of a multiplier 16. The arithmetic carrier signal is supplied to the other input terminal through a band pass filter (BPF) 19. A band pass filter (BPF) 17 is connected to an output terminal of the multiplier 16, and a comb filter (C-COMB) 18 for chrominance signal is connected to an output terminal of the band pass filter 17.

A voltage controlling oscillator (VCO) 20 generates a signal whose frequency is 320 times larger than the frequency of a horizontal sync signal $f_H$. The VCO 20 is connected to a divider 21. The divider 21 divides the frequency of the inputted signal to ⅛, and outputs four signals whose phases are different by 90°, respectively. The divider 21 is connected to a four-phase rotation circuit 22. The four-phase rotation circuit 22 sequentially outputs four signals, which are supplied from the divider 21, in accordance with control signals. The phases of these four signals differ by 90°. The four-phase rotation circuit 22 is connected to one input terminal of a multiplier 23. An oscillator (OSC) 24, which generates a color subcarrier frequency $f_{SC}$, is connected to the other input terminal of the multiplier 23. An output terminal of the multiplier 23 is connected to the input terminal of the BPF 19. The above example explains the VTR of a VHS format. However, in the case of the VTR of a D format, in place of the four-rotation circuit 22, a phase inverting circuit may be used. Moreover, in the case of a 8 mm format, in place of the four-phase rotation circuit 22, a phase inverting circuit in NTSC, and in the case of PAL, the four-phase rotation circuit may be used.

In order to understand the calculation processing of the multipliers 16 and 23 by a numerical expression, the output signals l, q, r of the low chrominance signal processor 15, the four-phase rotation circuit 22, and the OSC 24 are respectively expressed as follows:

$$l = B \cos(\omega_L t - \theta + \phi) \quad (5)$$

$$q = C \sin(\omega_L t + \theta + \phi) \quad (6)$$

$$r = D \cos \omega_{SC} t \quad (7)$$

wherein $\phi$: phase angle in recording, $\theta$: phase angle based on FIG. 16, $\omega_L = \frac{1}{2}\pi f_L$, and $f_L$=frequency of chrominance signal converted to low band.

In order to understand the setting of an input signal l of the multiplier 16 shown in the equation (5), FIG. 19 shows a simple structure of the color signal recording processing of the VTR. This circuit comprises a multiplier 25 and a low pass filter (LPF) 26.

In FIG. 19, a color signal St having a color subcarrier frequency $f_{SC}$ and an arithmetic carrier signal w for converting the color signal St to a low frequency can be set as follows:

$$St = E \sin(\omega_{SC} t + \theta) \quad (8)$$

$$w = F \sin\{(\omega_{SC} + \omega_L)t + \phi\} \quad (9)$$

from equations (1) and (2), $$\begin{aligned} u &= St \times w \\ &= EF/2 \: [\cos(\omega_L t - \theta + \phi) - \\ &\quad \cos\{(2\omega_{SC} + \omega_L)t + \theta + \phi\}] \end{aligned} \quad (10)$$

In FIG. 19, if a signal u passes through the LPF 26, only the first term of equation (10) is obtained, and a chrominance signal v can be obtained as follows.

$$v = G \cos(\omega_L t - \theta + \phi) \quad (11)$$

In a case where the signal v shown in equation (11) is recorded and reproduced, the same frequency component can be obtained as a reproducing signal. The equation (11) is the same as the equation (5) excepting that amplitude differs.

Then, back to FIG. 18, an output signal p of the multiplier 23 is obtained as follows:

From equations (6) and (7), $$p = q \times r = DC/2 \: [\sin\{(\omega_{SC} + \omega_L)t + \phi\} - \sin\{(\omega_{SC} - \omega_L)t - \phi\}] \quad (12)$$

The second term of the equation (12) is removed by the BPF 19 of FIG. 18, and an arithmetic carrier signal o is obtained. The arithmetic carrier signal o can be expressed as follows:

$$o = H \sin(\omega_{SC} + \omega_L)t + \phi) \quad (13)$$

The arithmetic carrier signal o is supplied to the multiplier 16. In the multiplier 16, the following calculation is performed.

From equations (5) and (13), $$\begin{aligned} m &= l \times o \\ &= BH/2 \: [\sin(\omega_{SC} t + \theta) + \\ &\quad \sin\{(\omega_{SC} + 2\omega_L)t - \theta + 2\phi\}] \end{aligned} \quad (14)$$

The second term of the equation (14) is removed by the BPF 17 of FIG. 18, and a chrominance signal b, which is expressed by the following equation (15), can be obtained from the output terminal C-COMB 18.

$$b = I \sin(\omega_{SC} t + \theta) \quad (15)$$

The frequency and the phase expression of the chrominance signal shown by the equation (15) are the same as those of each of the signals d and t shown by the equations (1) and (8), and the chrominance signal can be expressed by the phase angle shown in FIG. 16.

In the conventional color signal processor, the color signal reproduction processor 3 shown in FIG. 11 and the R-Y inverting section 6 were needed. As described above, the arithmetic carrier signal was needed in the R-Y inverting section 6. As shown in the above equation (2), there is needed a circuit structure such that no phase difference between the signal d shown in the equation (1) and the arithmetic carrier signal i. FIG. 20 explains the specific example of the circuit structure.

In FIG. 20, an output signal of an oscillator 30 for oscillating a color subcarrier frequency $f_{SC}$ is supplied to the frequency multiplier 13 through a variable phase shifter 31. The frequency multiplier 13 comprises a 90° phase shifting circuit 13a for inverting an output signal of the variable phase shifter 31, a multiplier 13b for multiplying the output of the variable phase shifter 31 and an output signal of the 90° phase shifting circuit 13a together, and a resonator 13c in which an output of the multiplier 13b is supplied thereto and a resonation frequency, which is twice as large as the color subcarrier frequency $f_{SC}$, is provided.

FIG. 21 shows the specific circuit of the variable phase shifter 31. The variable phase shifter 31 controls the phase of the input signal by use of a resonating circuit 33 connected between a collector of a transistor 32 and an emitter.

As is obvious from FIGS. 20 and 21, in the conventional color signal processor, the R-Y axis inverting section 6 includes the resonating circuit. Due to this, the circuit structure was complicated, and not suitable for the integrated circuit.

SUMMARY OF THE INVENTION

An object of the present invention is to provide a color signal processor wherein no R-Y axis inverting section including a resonating circuit is needed and the circuit structure can be simplified to be suitable for an integrated circuit.

The above object of the present invention can be attained by the following structure.

More specifically, there is provided a color signal processor comprising: first oscillating means for oscillating a signal whose frequency is an integral multiple of a chrominance signal whose frequency is converted to a low frequency; dividing means for dividing the signal oscillated by the first oscillating means, wherein the dividing means generates a plurality of signals whose phases are different from each other at 90°; selecting means for selecting the signal outputted from the dividing means in accordance with a control signal for controlling whether invert or not an R-Y axis of the chrominance signal, and outputting a selected signal, wherein the control signal is generated based on a divided horizontal sync signal; second oscillating means for oscillating a color subcarrier; first multiplying means for multiplying the color subcarrier oscillated from the second oscillating means and the selected signal outputted from the selecting means, wherein the first multiplying means multiplies the color subcarrier and the selected signal to generate a first arithmetic carrier signal when the R-Y axis of the chrominance signal is not inverted, and multiplies the color subcarrier and a signal whose phase is shifted at 180° outputted from the selecting means to generate a second arithmetic carrier signal when the R-Y axis of the chrominance signal is inverted; extracting means for extracting the first arithmetic carrier signal from a signal outputted from the first multiplying means when the R-Y axis is not inverted, and extracting the second arithmetic carrier signal from a signal outputted from the first multiplying means when the R-Y axis is inverted; second multiplying means for multiplying one of the first and second arithmetic carrier signals extracted from the extracting means and the chrominance signal whose frequency is converted to the low frequency; and filter means for removing an upper side band component, formed of a sum of the color subcarrier and the chrominance signal whose frequency is converted to the low frequency, and a lower side band component, formed of a difference between the color subcarrier and the chrominance signal whose frequency is converted to the low frequency, from the output signal of the second multiplying means.

According to the present invention, the carrier signal supplied to the multiplying means for the conversion of the frequency of the chrominance signal included in the reproduction processing of the VTR is changed in the case where the R-Y axis of the chrominance signal is inverted and the case where the R-Y axis of the chrominance signal is not inverted. Moreover, there is provided the filter means for removing the upper side band component, formed of the sum of the color subcarrier, which is generated in changing the arithmetic carrier, and the chrominance signal whose frequency is converted to the low frequency, and the lower side band component, formed of the difference therebetween. Therefore, since the arithmetic function of inverting the R-Y axis is provided to the multiplying means for the conversion of the frequency of the chrominance signal, it is not needed that a circuit for inverting the R-Y axis be added, separately, so that the circuit structure can be simplified. Moreover, since no resonating circuit is used in the present invention, the present invention is suitable for an integrated circuit.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit structural view showing a first embodiment of the present invention;

FIG. 5 is a circuit diagram showing the main parts of FIG. 1;

FIG. 6 is a timing chart showing an operation of FIG. 5;

DETAILED DESCRIPTION OF THE PREFERRED EMBODIMENTS

Embodiments of the present invention will be described with reference to the drawings.

Figure 11:
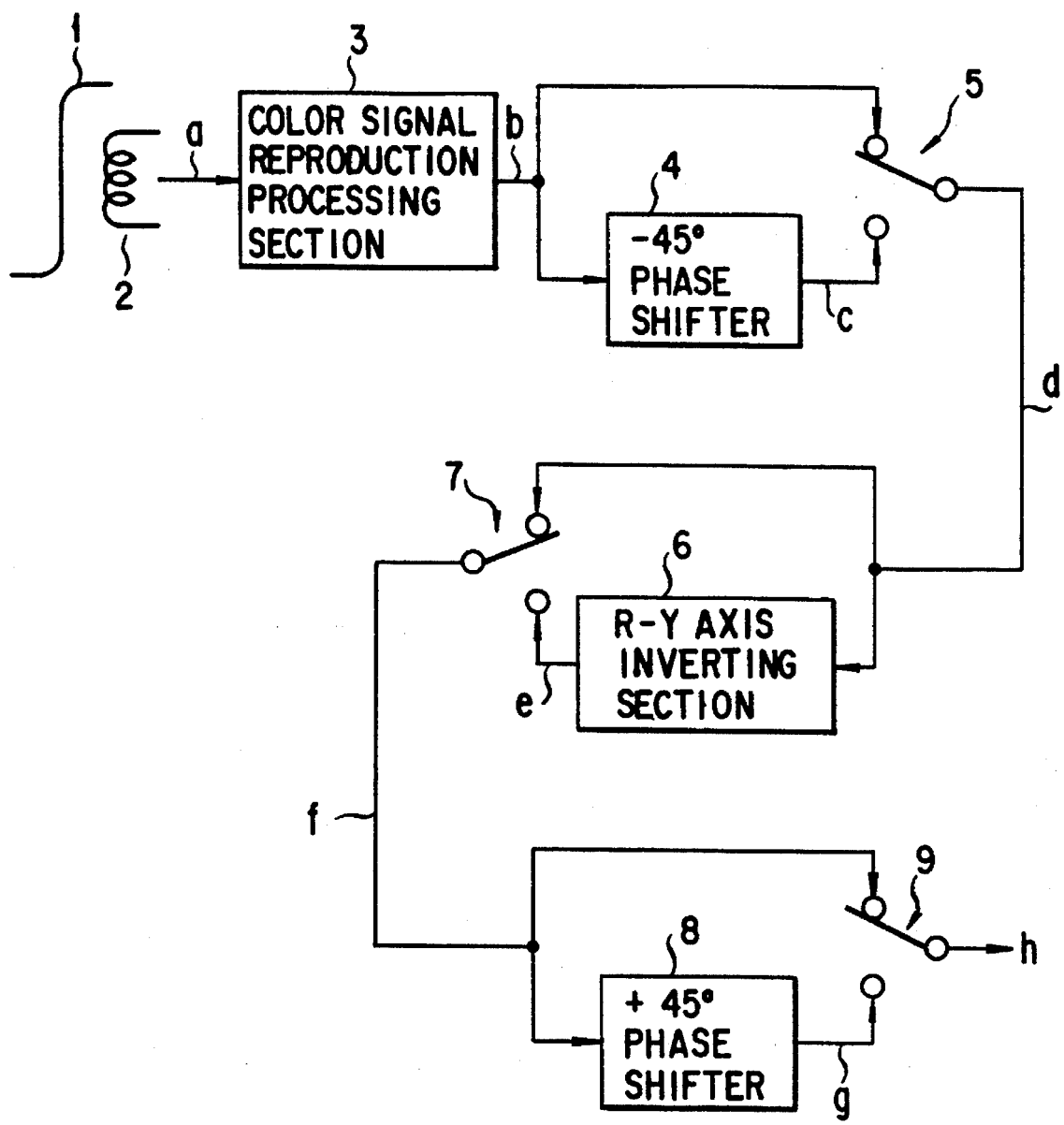
FIG. 11 is a circuit structural view showing a conventional color signal processor of VTR.
Figure 12:
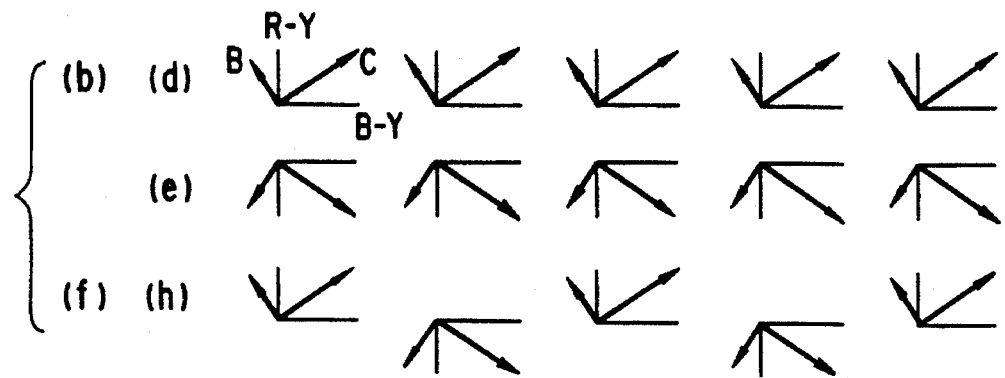
FIG. 12 shows an operation of FIG. 11 to explain the process of a skew correction at the time of a PAL special reproduction.
Figure 13:
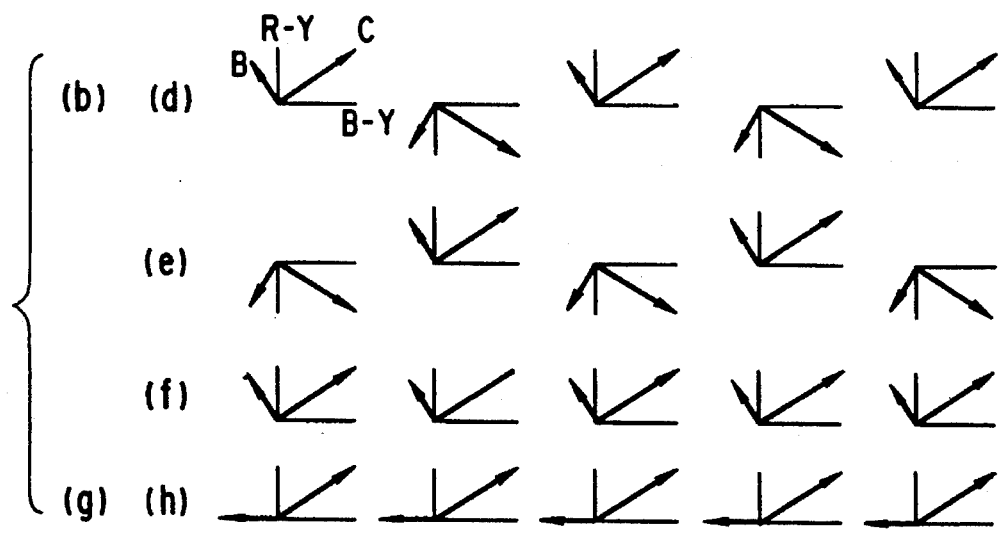
FIG. 13 shows an operation of FIG. 11 to explain the process of the conversion of a PAL format to an NTSC format.
Figure 14:
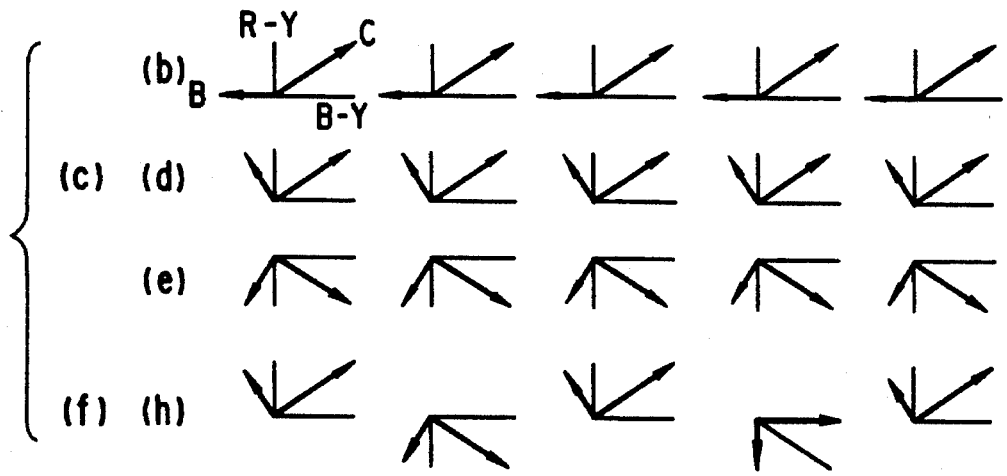
FIG. 14 shows an operation of FIG. 11 to explain the process of the conversion of the NTSC format to the PAL format.
Figure 15:
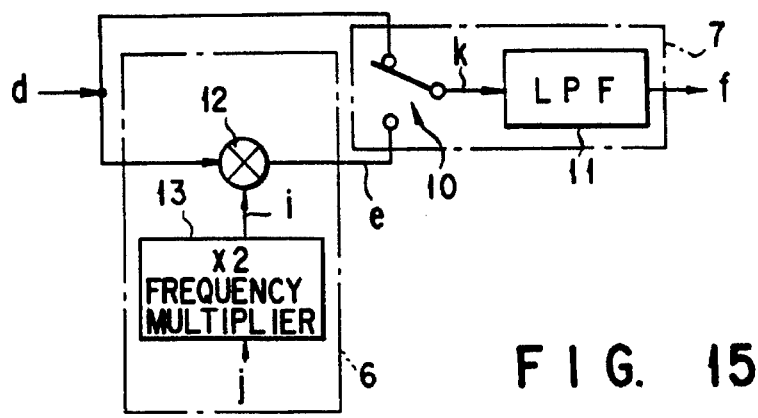
FIG. 15 is a circuit diagram specifically showing an R-Y axis inverting section and a switch shown in FIG. 11.
Figure 16:
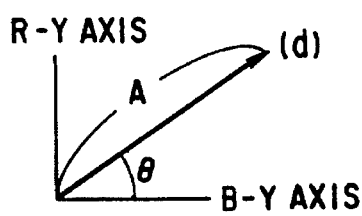
FIG. 16 is a view explaining an operation of FIG. 15.
Figure 17:
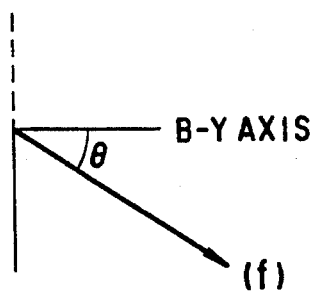
FIG. 17 is a view explaining an operation of FIG. 15.

FIG. 1 shows the first embodiment of the present invention. In FIG. 1, the same reference numerals are added to the common portions to FIGS. 11 and 18.

Figure 18:
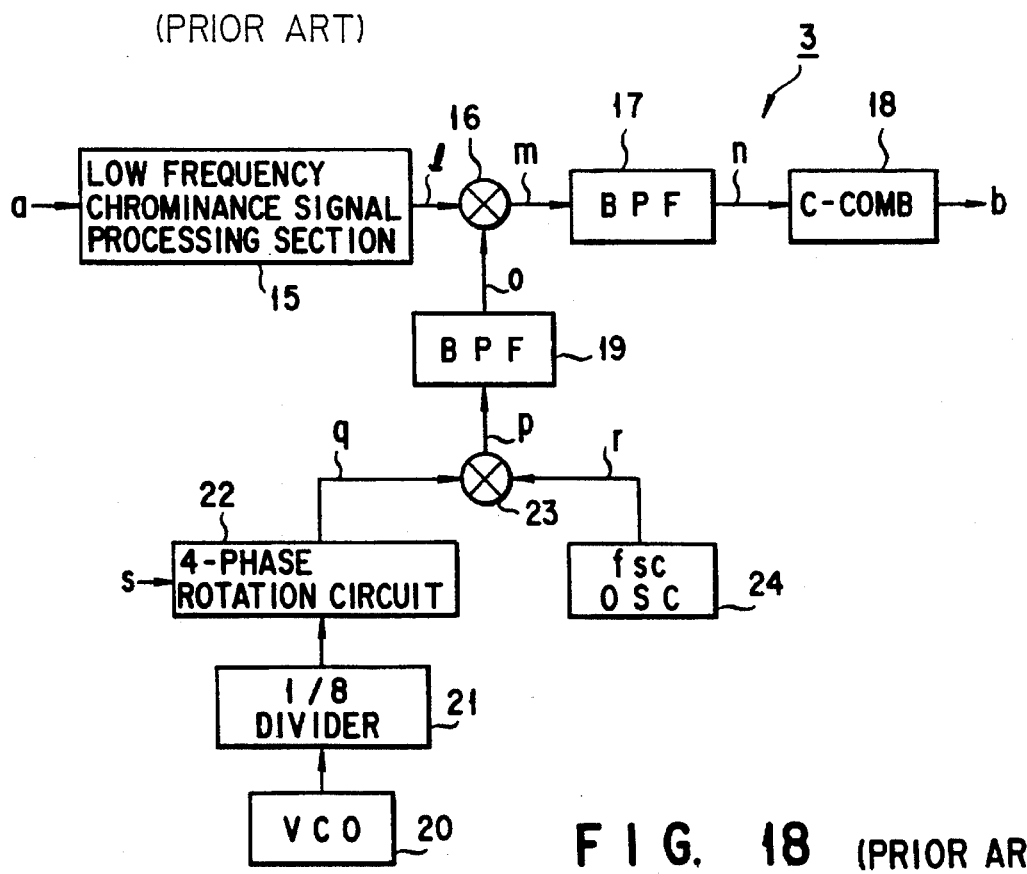
FIG. 18 is a circuit diagram specifically showing a color signal reproducing processor of FIG. 11.
Figure 19:
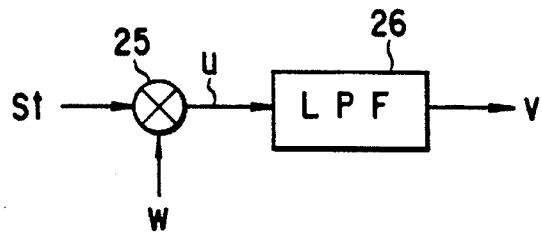
FIG. 19 is a circuit diagram showing FIG. 18, which is partially simplified.
Figure 20:
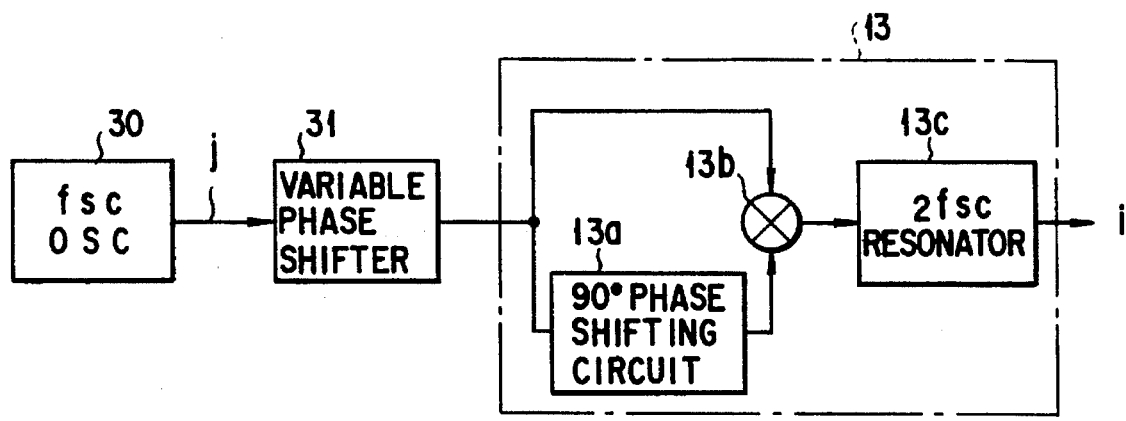
FIG. 20 is a circuit diagram specifically showing the R-Y axis inverting section of FIG. 11.
Figure 21:
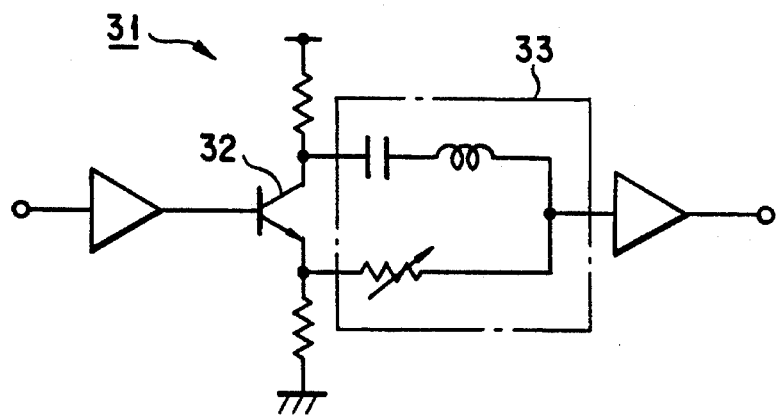
FIG. 21 is a circuit diagram specifically showing a variable phase shifter of FIG. 20.

In FIG. 1, the different point from FIG. 18 is that a R-Y axis of the chrominance signal is inverted in a multiplier 16, so that no R-Y axis inverting section is presented after the multiplier 16. An image signal a reproduced from a magnetic tape by a magnetic head (not shown) is supplied to a low chrominance signal processor 15. The low chrominance signal processor 15 removes an unnecessary component of a chrominance signal having a low frequency outputted from the magnetic head. The low chrominance signal processor 15 sets amplitude of the chrominance signal to a certain reference level, and supplies the chrominance signal to one input terminal of a multiplier 16. An output terminal of a switch 41 is connected to the other input terminal of the multiplier 16. A BPF 42 is connected to the output terminal of the multiplier 16, and a C-COMB 18 is connected to the output terminal of the BPF 42. An output terminal of the C-COMB 18 is directly connected to a first input terminal of a switch 43, connected to a second input terminal of the switch 43 through a −45° phase shifter 4, and connected to a third input terminal of the switch 43 through a +45° phase shifter 8.

A voltage controlling oscillator (VCO) 20 generates a signal whose frequency is 320 times larger than the frequency of a horizontal sync signal $f_H$. The VCO 20 is connected to a divider 21. The divider 21 divides the frequency of the inputted signal to ⅛, and outputs four signals CW0°, CW90°, CW180°, CW270° whose phases are different by 90°, respectively. An output terminal of the divider 21 is connected to a phase shifter 44. The phase shifter 44 outputs four signals, which are supplied from the divider 21 and have phases different by 90° in accordance with phase control signals. An output terminal of the phase shifter 44 is connected to one input terminal of a multiplier 23. An OSC 24 for generating a color subcarrier $f_{SC}$ is connected to the other input terminal of the multiplier 23. An output terminal of the multiplier 23 is connected to each input terminal of BPFs 19 and 45. An output terminal of the BPF 19 is connected to one input terminal of the switch 41, and an output terminal of the BPF 45 is connected to the other input terminal of the switch 41. The switch 41 is changed by a signal in which a horizontal sync signal is ½ divided in the cases of a PAL→NTSC conversion and an NTSC→PAL conversion. Also, if a skew is detected by a detecting circuit (not shown), the switch 41 is changed by the signal in which the horizontal sync signal is ½ divided in the case of a skew correction.

In the above-mentioned structure, the following will explain an operation.

First, in the case where an R-Y axis is not inverted, the switch 41 selects an output signal x of a BPF 19. At this time, since the circuit of FIG. 1 includes the multiplier 23 and BPF 19, the same structure as FIG. 18 is formed. Due to this, the output signal of the BPF 19, that is, arithmetic carrier signal o, and an output signal m of the multiplier 16 obtain the same results as the prior art by use of the equations (5), (6), and (7).

$$l=B \cos (\omega_L t - \theta + \phi) \quad (5)$$

$$q=C \sin (\omega_L t + \phi) \quad (6)$$

$$r=D \cos \omega_{SC} t \quad (7)$$

$$p=q \times r = DC/2 [\sin \{(\omega_{SC}+\omega_L)t+\phi\} - \sin (\omega_{SC}-\omega_L)t-\phi\}] \quad (12)$$

$$o=xH \sin \{(\omega_{SC}+\omega_L)t+\phi\}] \quad (16)$$

$$m = l \times x = l \times o \quad (17)$$
$$= BH/2 [\sin(\omega_{SC} t + \theta) + \sin\{(\omega_{SC} + 2\omega_L)t + 2\phi\}]$$

On the other hand, in the case where an R-Y axis is inverted, the switch 41 selects an output signal y of a BPF 45, and changes the arithmetic carrier signal of the multiplier from o to o'. In response to this change, the signals q, p, m are changed to q', p', m', respectively. The signal q' can be obtained by setting the phase angle φ of the signal q of equation (6) to (180°+φ) by a phase control signal s, and expressed by the following equation (18).

$$q' = C\sin(\omega_L t + 180° + \phi) \quad (18)$$
$$= -C\sin(\omega_L t + \phi)$$

The output signal p' of the multiplier 23 can be obtained by the following equation (19).

$$p' = q' \times r \quad (19)$$
$$= DC/2 [-\sin\{(\omega_{SC}+\omega_L)t+\phi\} + \sin\{(\omega_{SC}-\omega_L)t-\phi\}]$$

The first term of the equation (19) is removed by a BPF 45, which is not provided in FIG. 18, and which no phase difference is generated between the BPF 19 and BPF 45, and a signal y is outputted from the BPF 45. The signal y is selected by the switch 41, and the carrier signal o' can be obtained by the following equation (20).

$$o'=y=(DC/2) \sin \{(\omega_{SC}-\omega_L)t-\phi\} \quad (20)$$

The multiplier 16 outputs the output signal m' by the calculation based on the following equation (21).

$$m' = l \times o' = l \times y \quad (21)$$
$$= BH/2 [\sin(\omega_{SC} t - \theta) + \sin\{(\omega_{SC} - 2\omega_L)t + \theta - 2\phi\}]$$

As mentioned above, the output signals m and m' shown by the equations (17) and (21) can be obtained by the change of the arithmetic carrier signals o and o'. Both output signals m and m' are supplied to the BPF 42.

The BPF 17 of FIG. 18 removed the frequency component of $(\omega_{SC}+2\omega_L)$. BPF 42 comprises a property of removing an upper side band component of $(\omega_{SC}+2\omega_L)$ and a lower side band component of $(\omega_{SC}-2\omega_L)$. Therefore, in the case where the R-Y axis is not inverted, an output signal n of the BPF 42 to which the output signal m of the multiplier 16 is supplied can be obtained by the following equation (22).

$$n=J \sin (\omega_{SC} t + \theta) \quad (22)$$

Moreover, in the case where the R-Y axis is inverted, an output signal n of the BPF 42 to which the output signal m' of the multiplier 16 is supplied can be obtained by the following equation (23).

$$n=J \sin (\omega_{SC} t - \theta) \quad (23)$$

The signals n expressed by the equations (22) and (23) correspond to the signal d expressed by the equation (1) and the signal f expressed by the equation (4), respectively, and it can be understood that the R-Y axis is inverted. The output signal n of the BPF 42 is supplied to the C-COMB 18, and the chrominance signal b is outputted from the C-COMB 18. The chrominance signal b is outputted by changing the switch 43 in accordance with the skew correction at the time of the PAL special reproduction, the PAL→NTSC conversion, and the NTSC→PAL conversion.

Figure 2:
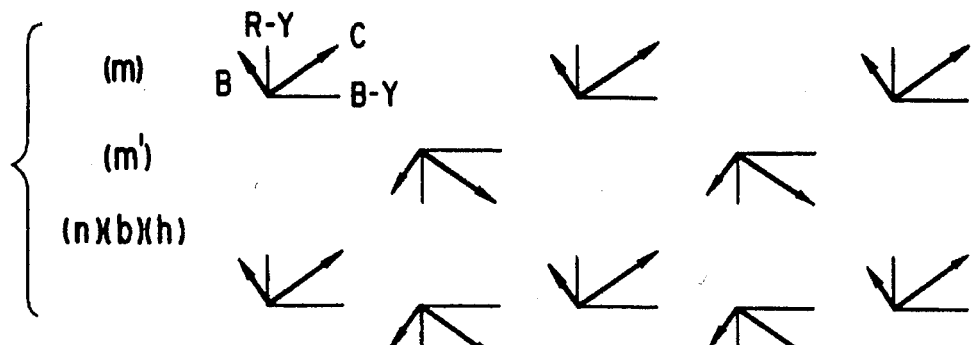
FIG. 2 shows an operation of FIG. 1 to explain the process of a skew correction at the time of a PAL special reproduction.

FIG. 2 shows the process of the skew correction at the time of the PAL special reproduction. In this case, the switch 43 selects a first input terminal, and outputs the output signal b of the C-COMB 18 as an output signal h.

Figure 3:
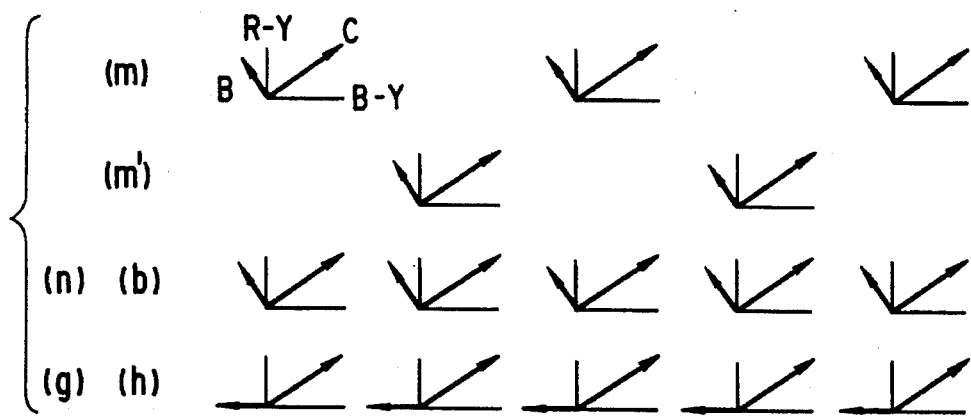
FIG. 3 shows an operation of FIG. 1 to explain the process of the conversion of a PAL format to an NTSC format.

FIG. 3 shows the process of the PAL→NTSC conversion. In this case, the switch 43 alternatively selects a second and third input terminals, and outputs the output signal g of the +45° phase shifter 8 as an output signal h.

Figure 4:
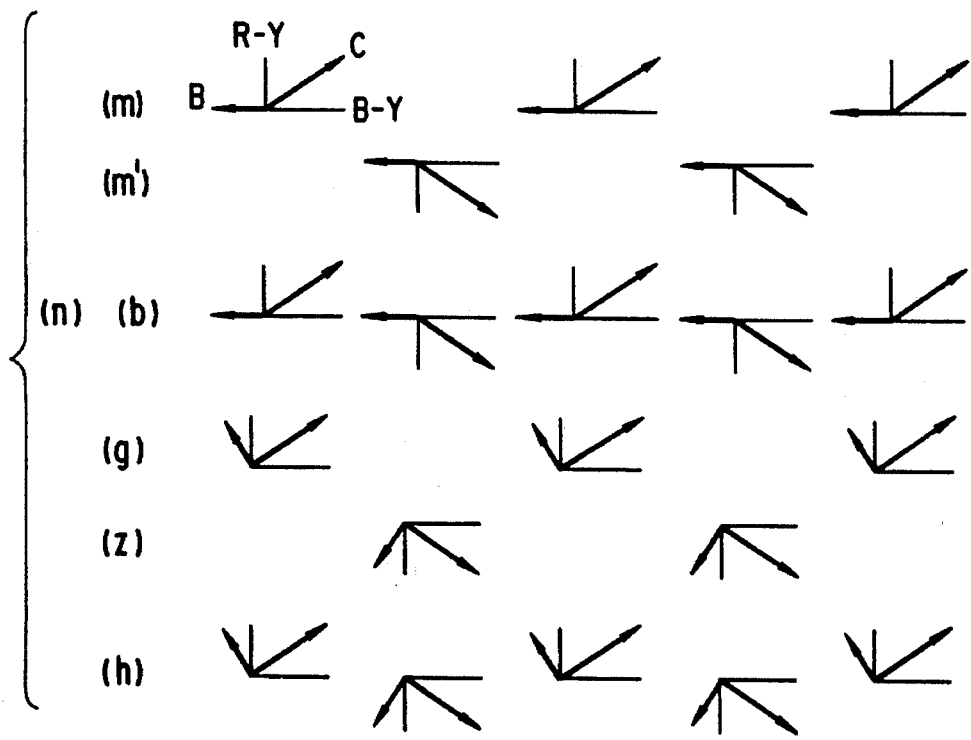
FIG. 4 shows an operation of FIG. 1 to explain the process of the conversion of the NTSC format to the PAL format.

FIG. 4 shows the process of the NTSC→PAL conversion. In this case, the switch 43 alternatively selects the second and third input terminals every 1 H, and outputs an output signal z of the −45° phase shifter 4 as an output signal h and an output signal g of the +45° phase shifter 8, alternately.

FIG. 5 shows a generating circuit 51 for generating the phase shift controlling signals of the phase shifter 41 of the VHS format. The generating circuit 51 outputs signals PS and PI as phase shift controlling signals.

The phase shifter 44 comprises AND circuits 44a to 44f, OR circuits 44g to 44i, and inverters 44j and 44k. Signals CW0°, CW90°, CW180°, and CW270°, which are outputted from the divider 21, are supplied to one input terminal of each of the AND circuits 44a to 44d, respectively. Then, the signal PS, which is outputted from the generating circuit 51, is supplied to the other input terminal of each of the AND circuits 44a and 44c. The signal PS, which is inverted by the inverter circuit 44j, is supplied to the other input terminal of each of the AND circuits 44b and 44d. The output signals of the AND circuits 44a and 44b are supplied to the OR circuit 44g, and the output signals of the AND circuits 44c and 44d are supplied to the OR circuit 44h. The output signal of the OR circuit 44g is supplied to one input terminal of the AND circuit 44e, and the output signal of the OR circuit 44h is supplied to one input terminal of the AND circuit 44f. The signal PI is supplied to the other input terminal of the AND circuit 44e, and the signal PI, which is inverted by the inverter circuit 44k, is supplied to the other input terminal of the AND circuit 44f. The output signals of these AND circuits 44e and 44f are supplied to an OR circuit 44i, and the signals q and q' are outputted from the OR circuit 44i.

The generating circuit 51 comprises D type flip-flop circuit 51a to 51c (hereinafter called as DFF), AND circuits 51d to 51g, NAND circuits 51h to 51m, an OR circuit 51n, inverter circuits 51o and 51p, and a switch 51q. An output terminal Q of the DFF 51a is connected to one input terminal of the NAND circuit 51h, and an output terminal/Q ("/" shows an inversion in the specification) is connected to an input terminal D of the DFF 51a and one input terminal of the NAND circuit 51i. An output terminal Q of the DFF 51c is connected to the other input terminal of the NAND circuit 51h, and the output terminal/Q is connected to an input terminal D of the DFF 51c and the other input terminal of the NAND circuit 51i. A burst ID inverting signal is supplied to an input terminal CK of the DFF 51c. The burst ID inverting signal inverts polarity of the burst signal to the phase of the color subcarrier. For example, the burst ID inverting signal is always in a high level. The output terminals of the NAND circuits 51h and 51i are connected to the input terminal of the NAND circuit 51j, and the output terminal of the NAND circuit 51j is connected to one input terminal of the switch 51q, and one input terminal of each of the AND circuits 51f and 51g.

Also, a horizontal sync signal HD is supplied to one input terminal of the AND circuit 51d. The output terminal of the AND circuit 51d is connected to an input terminal CK of the DFF 51b. The output terminal D of the DFF 51b is connected to one input terminal of the NAND circuit 51k, and the output terminal/Q is connected to the input terminal D of the DFF 51b and one input terminal of the NAND circuit 51l.

In NTSC→PAL conversion, a color rotation signal CR is a signal, which is set to a high level at a first video track CH1 of the NTSC format, and a low level at a second video track CH2. The color rotation signal CR is supplied to the other input terminal of the NAND circuit 51l, and the other input terminal of the NAND circuit 51k through the inverter circuit 51p. Moreover, the output of the inverter circuit 51p is supplied to one input terminal of the NAND circuit 51m. An identification signal P/N, which shows the NTSC format and the PAL format, is supplied to the other input terminal of the NAND circuit 51m. The identification signal P/N is set to be in a low level in the case that the chrominance signal to be processed is in the NTSC format. Moreover, the identification signal P/N is set to be in a high level in the case that the chrominance signal to be processed is in the PAL format. The output signal of the NAND circuit 51m is supplied to the other input terminal of the AND circuit 51d.

The output terminals of the NAND circuits 51k and 51l are connected to the input terminal of the AND circuit 51e, respectively. The output terminal of the AND circuit 51e is connected to the inverter circuit 44j of the phase shifter 44, the other input terminal of the AND circuit 51f, and the other input terminal of the AND circuit 51g through the inverter circuit 51o. The output terminals of these AND circuits 51f and 51g are connected to the input terminal of the OR circuit 51n, respectively, and the output terminal of the OR circuit 51n is connected to the other input terminal of the switch 51q. The output terminal of the switch 51q is connected to the inverter circuit 44k of the phase shifter 44.

FIG. 6 is an example of an operation of the generating circuit 51, and shows a timing chart of each section in the case where the chrominance signal of the first video track CH1 of the NTSC format is converted to the PAL system. The DFF 51b divides the horizontal synch signal HD into ½. The AND circuit 51e outputs the signal in which the horizontal sync signal HD is divided into ½ as a signal PS in accordance with the color rotation signal CR and the identifying signal P/N. Also, the DFF 51a divides the horizontal sync signal HD into ¼. In this case, the switch 51q selects the output signal of the OR circuit 51n. Therefore, the switch 51q outputs the signal in which the horizontal sync signal HD is divided into ¼ as a signal PI. The phase shifter 44 selectively outputs signals CW0°, CW90°, CW180°, CW270°, which are outputted from the divider 21, in accordance with the signals PS and PI.

Figures 7A, 7B, 8:
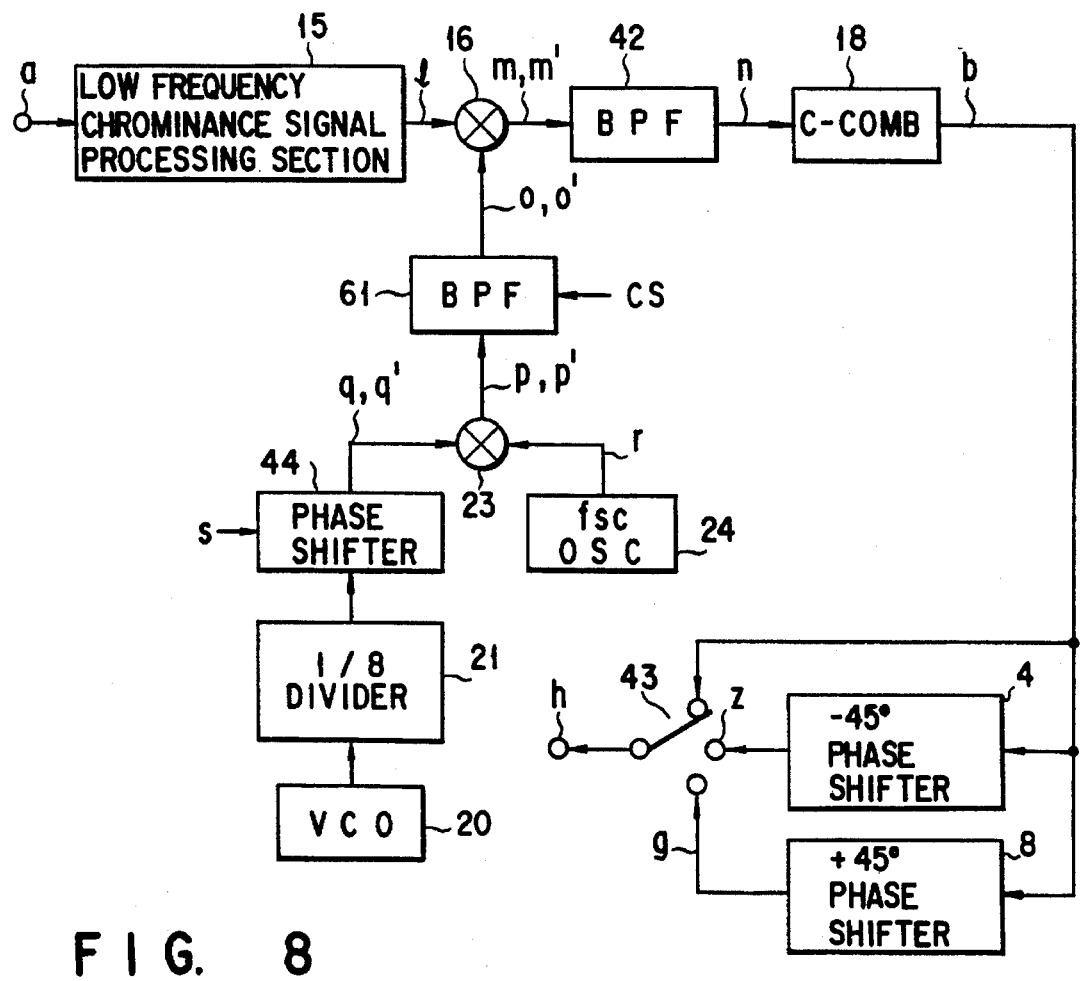
FIGS. 7A and 7B are views showing the operation of FIG. 5, respectively.
FIG. 8 is a circuit structural view of a second embodiment of the present invention.

FIGS. 7A and 7B show the operation of FIG. 5. FIG. 7A shows the phases q and q' corresponding to the signals PS and PI every 1 H in the case where the chrominance signal of the first video track CH1 of the NTSC format is converted to the PAL format. In this case, the phases q and q' are inverted from 90° to 270° at 2 H, and the phases q and q' are inverted from 180° to 90° at 4 H. FIG. 7B shows the phases q and q' corresponding to the signals PS and PI every 1 H in the case where the chrominance signal of the second video track CH2 of the NTSC format is converted to the PAL format. In this case, the phases q and q' are inverted from 0° to 180° at 2 H, and the phases q and q' are inverted from 270° to 90° at 4 H.

According to the above first embodiment, the arithmetic carrier signal, which is supplied to the multiplier 16, is changed in accordance with the case that the R-Y axis is inverted or the case that the R-Y axis is not inverted. Then, the signal in which the R-Y axis is inverted and the signal in which the R-Y axis is not inverted are extracted from the signals outputted from the multiplier 16 by use of the BPF 42. Therefore, unlike the conventional case, since no inverting circuit for inverting the R-Y axis is needed, the circuit structure can be simplified. Moreover, since no inverting circuit including the resonating circuit is provided, the present invention is suitable for an integrated circuit.

FIG. 8 shows a second embodiment of the present invention, the same reference numerals are added to the same portions as the first embodiment, and the following will explain only the part, which is different from the first embodiment.

In the second embodiment, in place of the BPFs 19 and 45 of FIG. 1, and the switch 41, a BPF 61 is mutually connected between the multipliers 23 and 16. The BPF 61 selects one of two types of passing bands in accordance with the control signal CS. More specifically, a first passing band is the same as the BPF 19, and a second passing band is the same as the BPF 45. Therefore, the control signal CS is changed in accordance with the case that the R-Y axis is inverted or the case that the R-Y axis is not inverted, and the passing band of the BPF 61 is set, whereby the same technical advantage as the first embodiment can be obtained.

Figure 9:
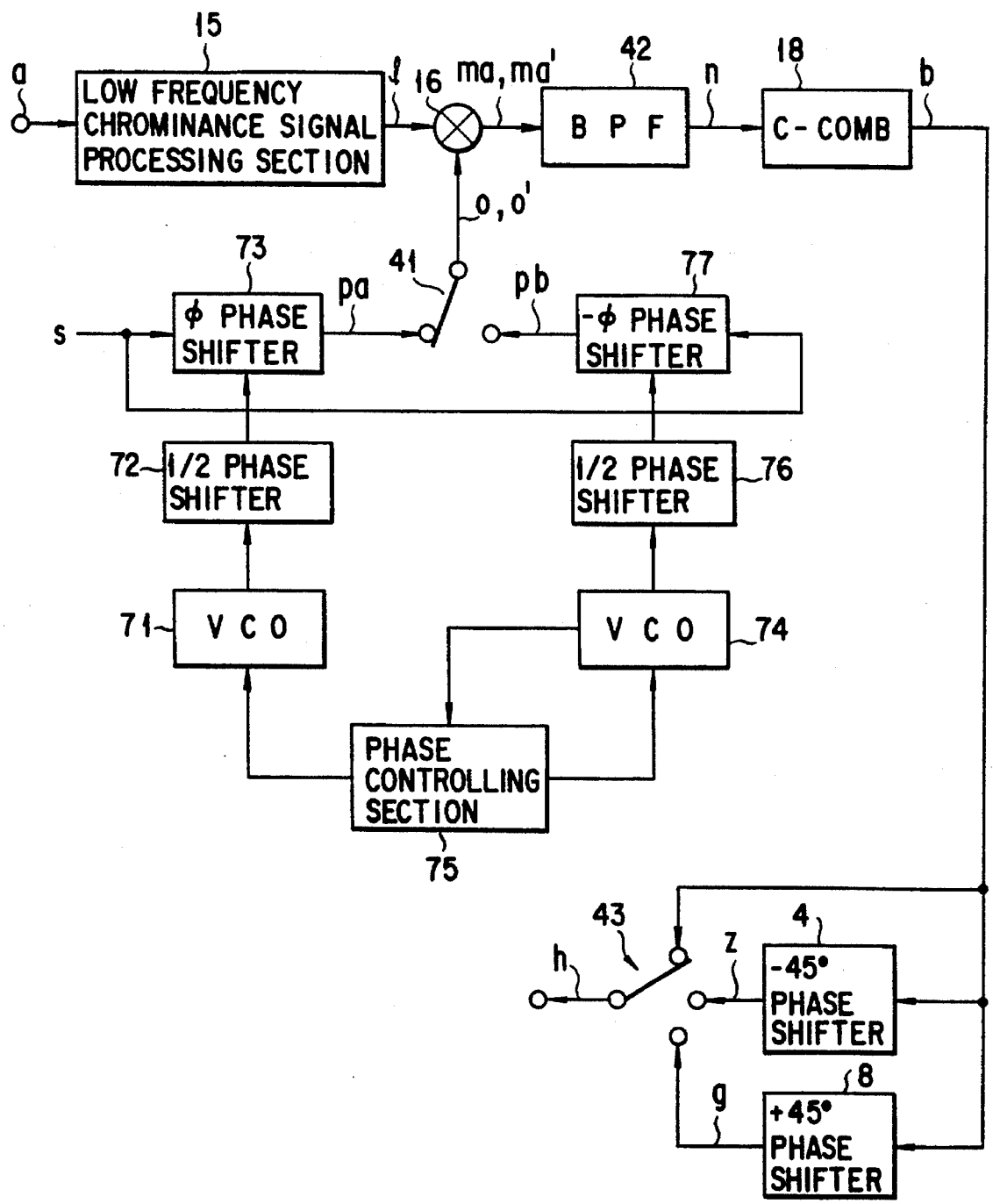
FIG. 9 is a circuit structural view of a third embodiment of the present invention.

FIG. 9 shows a third embodiment of the present invention, the same reference numerals are added to the same portions as the first embodiment, and the following will explain only the part, which is different from the first embodiment.

AVCO 71 generates a signal having a frequency of, for example, 8.42 MHz=535 $f_H$. The output signal of the VCO 71 is supplied to a divider 72. The divider 72 divides the frequency of the input signal to ½, and generates a plurality of signals whose phases are different by 90°. An output signal of the divider 72 is supplied to a first phase shifter 73. The phase shifter 73 selectively outputs a signal pa whose phase is different by 90° supplied from the divider 72 in accordance with the phase control signals.

On the other hand, a VCO 74 generates a signal having a frequency of, for example, 5.9 MHz=375 $f_H$. The VCO 74 is provided such that the phases of the VCO 74 are arranged to correspond to those of the VCO 71 by a phase controlling section 75. The output signal of the VCO 74 is supplied to a divider 76. The divider 76 divides the frequency of the input signal to ½, and generates a plurality of signals whose phases are different by 90°. An output signal of the divider 76 is supplied to a second phase shifter 77. The phase shifter 77 selectively outputs a signal pb whose phase is different by 90° supplied from the divider 76 in accordance with the phase control signals.

The VCO 71 is a reference generator for directly generating the signal expressed by the equation (16) of the first embodiment. Similar to the equation (16), the signal pa outputted from the phase shifter 73 can be expressed as follows.

$$pa=H \sin \{(\omega_{SC}+\omega_L)t+\phi\} \tag{24}$$

The VCO 74 is a reference generator for directly generating the signal expressed by the equation (20) of the first embodiment. In order to eliminate the phase difference between the signals pa and pb, the VCO 74 controls the phase of the directly generated signal by use of a phase controlling section 75. Similar to the equation (20), the signal pb outputted from the phase shifter 77 can be expressed as follows.

$$pb=H \sin \{(\omega_{SC}-\omega_L)t-\phi\} \tag{25}$$

It is assumed that a signal ma will be outputted from the multiplier 16 in a case that the switch 41 selects the signal pa as an arithmetic carrier signal o of the multiplier 16. Also, it is assumed that a signal mb will be outputted from the multiplier 16 in a case that the switch 41 selects the signal pb as an arithmetic carrier signal o of the multiplier 16. In this case, from the similar calculation process to the output signals m, m' of the multiplier 16, regarding the signal ma, the same result as the equation (17) can be obtained. Also, regarding the signal mb, the same result as the equation (21) can be obtained. More specifically, the signals ma and mb can be expressed as follows.

$$ma=BH/2 [\sin (\omega_{SC}t+\theta)+\sin \{(\omega_{SC}+2\omega_L)t-\theta+2\phi\}] \tag{26}$$

$$mb=BH/2 [\sin (\omega_{SC}t-\theta)+\sin \{(\omega_{SC}+2\omega_L)t+\theta-2\phi\}] \tag{27}$$

The output signal ma or mb of the multiplier 16 is supplied to the BPF 42. In the case that the R-Y is not inverted, the signal n, which is expressed by the equation (28), is outputted from the BPF 42. In the case that the R-Y is inverted, the signal n, which is expressed by the equation (29), is outputted from the BPF 42.

$$n=J \sin (\omega_{SC}t+\theta) \tag{28}$$

$$n=J \sin (\omega_{SC}t-\theta) \tag{29}$$

As shown in the equations (28) and (29), by changing the arithmetic carrier signal o, which is supplied to the multiplier 16, there can be obtained the signal in which the R-Y axis is inverted and the signal in which the R-Y axis is not inverted.

Figure 10:
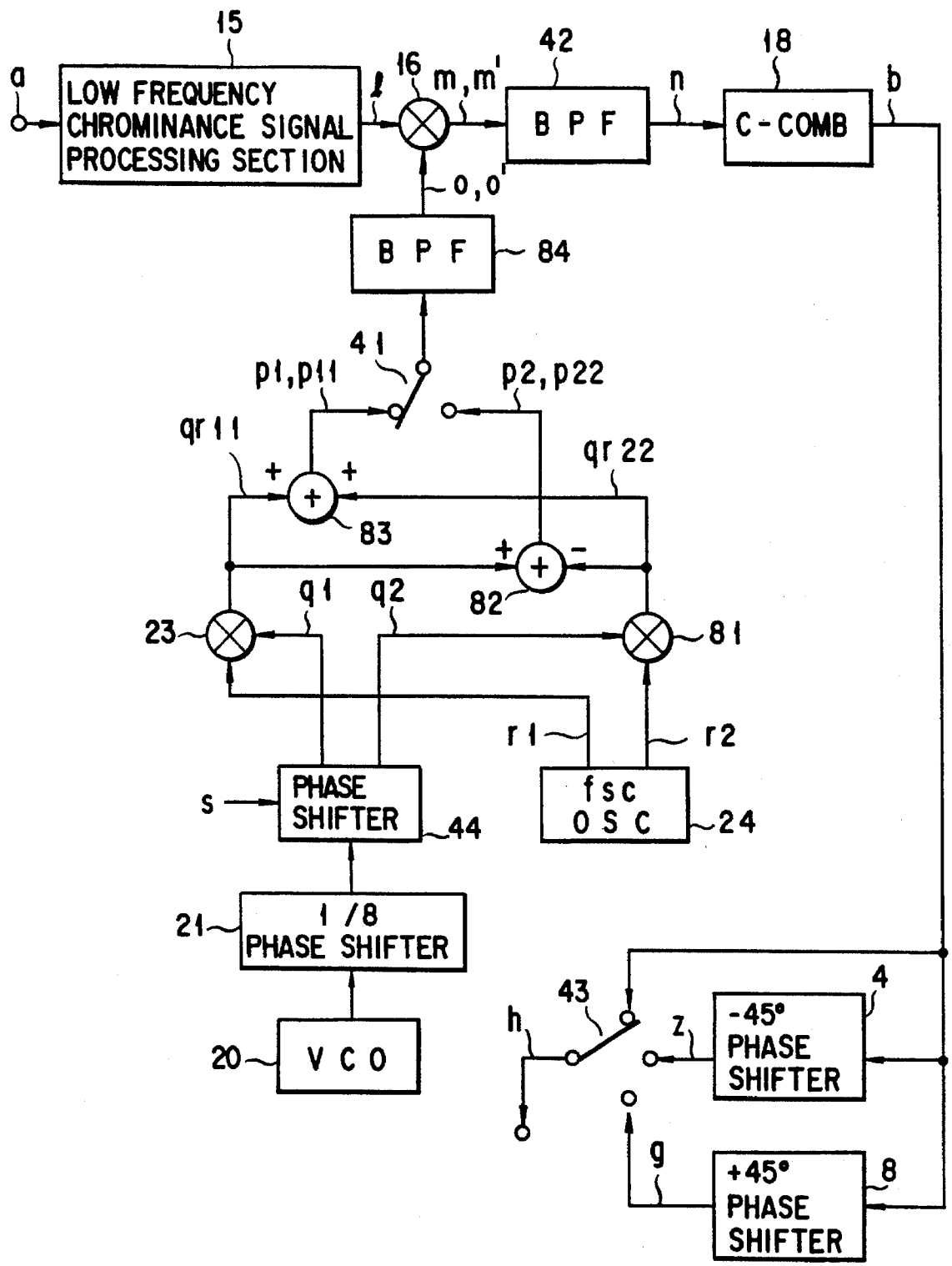
FIG. 10 is a circuit structural view of a fourth embodiment of the present invention.

FIG. 10 shows a fourth embodiment of the present invention, the same reference numerals are added to the same portions as the first embodiment, and the following will explain only the part, which is different from the first embodiment.

In the first embodiment, two BPFs 19 and 45 were used to extract the arithmetic carrier signal. In the second embodiment, BPF 61, which can change the passing band, was used. In contrast, according to the fourth embodiment, one BPF 84 in which the passing band is fixed is used to extract the arithmetic carrier signal. Due to this, according to the fourth embodiment, in order to obtain the arithmetic carrier signals o and o', the unnecessary component is removed by the calculations using the multipliers 23 and 81, and adders 82 and 83.

More specifically, in FIG. 10, the multiplier 23 multiplies one output signal of the phase shifter 44 and the output signal of the OSC 24 together. The multiplier 81 multiplies the other output signal of the phase shifter 44 and the output signal of the OSC 24 together. The adder 82 inverts the output signal of the multiplier 81, and adds the inverted output signal to the output signal of the multiplier 23. In other words, the adder 82 subtracts the output signal of the multiplier 81 from the output signal of the multiplier 23. The adder 83 adds the output signal of the multiplier 23 and the output signal of the multiplier 81 together. The output terminal of the adder 83 is connected to one input terminal of the switch 41, and the output terminal of the adder 82 is connected to the other input terminal of the switch 41. The output terminal of the switch 41 is connected to the input terminal of the BPF 84, and the output terminal of the BPF 84 is connected to the multiplier 16.

According to the above structure, I/O signals q1, r1, qr11 of the arithmetic unit 23 are the same as the I/O signals q, r, p of the multiplier 23 of FIG. 1.

The input signals q1 and r1 of the arithmetic unit 23 correspond to the above equations (6) and (7), and can be defined by the following equations.

$$q1=C \sin (\omega_L t+\phi) \tag{30}$$

$$r1=D \cos \omega_{SC}t \tag{31}$$

Moreover, the input signals q2 and r2 of the multiplier 81 select a signal having a 90° phase difference between the signals q1 an r1, and can be defined by the following equations.

$$q2=C \cos (\omega_L t+\phi) \tag{32}$$

$$r1=D \sin \omega_{SC}t \tag{33}$$

The output signal qr11 of the multiplier 23 can be expressed as follows.

From the equations (30) and (31), $$qr11 = q1 \times r1 \quad (34)$$
$$= DC/2 [\sin\{(\omega_{SC}+\omega_L)t+\phi\} - \sin\{(\omega_{SC}-\omega_L)t-\phi\}]$$

The above result is the same as the result of the equation (12) derived from the equations (6) and (7). Moreover, the output signal qr22 of the multiplier 81 can be expressed as follows.

From the equations (32) and (33), $$qr22 = q2 \times r1 \quad (35)$$
$$= DC/2 [\sin\{(\omega_{SC}+\omega_L)t+\phi\} + \sin\{(\omega_{SC}-\omega_L)t-\phi\}]$$

The output signal P1 of the adder 83 can be expressed as follows.

$$P1 = qr11 + qr22 \quad (36)$$
$$= -DC\sin\{(\omega_{SC}+\omega_L)t+\phi\}$$

Also, the output signal P1 of the adder 82 can be expressed as follows.

$$P2 = qr11 - qr22 \quad (37)$$
$$= -DC\sin\{(\omega_{SC}-\omega_L)t-\phi\}$$

The signals P1 and P2 shown by the equations (36) and (37) are signals, which are prepared when the R-Y axis is not inverted.

The signal P1 obtained from the switch 41 passes through the BPF 84, and becomes the arithmetic carrier signal o. Moreover, the signal m, serving as an output of the multiplier 16, can be obtained. The signals o and m obtained when the R-Y axis is not inverted correspond to the signals o and m shown in the first embodiment.

In the case where the R-Y axis is inverted, the phase angle φ, that is, (φ+180°) is substituted for equations (36) and (37).

At this time, the output signal P11 of the adder 83 can be expressed from the equation (36) as follows.

$$P11 = DC\sin\{(\omega_{SC}+\omega_L)t+180°+\phi\} \quad (38)$$
$$= -DC\sin\{(\omega_{SC}-\omega_L)t+\phi\}$$

Moreover, the output signal P22 of the adder 82 can be expressed from the equation (37) as follows.

$$P22 = -DC\sin\{(\omega_{SC}-\omega_L)t-(180°+\phi)\} \quad (39)$$
$$= DC\sin\{(\omega_{SC}-\omega_L)t-\phi]$$

The signals P11 and P22 shown by the equations (38) and (39) are signals, which are prepared when the R-Y axis is inverted. The signal P22 obtained from the switch 41 passes through the BPF 84, and becomes the arithmetic carrier signal o'. Moreover the signal m', serving as an output of the multiplier 16, can be obtained.

Therefore, the arithmetic carrier signal o obtained when the R-Y axis is not inverted can be expressed as follows.

From equation (36), $$o = H \sin\{(\omega_{SC}+\omega_L)t+\phi\} \quad (40)$$

Moreover, the arithmetic carrier signal o' obtained when the R-Y axis is inverted can be expressed as follows.

From equation (39), $$o' = H \sin\{(\omega_{SC}-\omega_L)t-\phi\} \quad (41)$$

In other words, the arithmetic carrier signals, which are expressed by the equations (40) and (41), are the same as the arithmetic carrier signals, which are expressed by the equations (16) and (20). Therefore, the same result as the first embodiment can be obtained from the fourth embodiment.

It is noted that the present invention is not limited to the above-mentioned embodiments, and that various modifications can be worked in the range that the gist of the invention is unchanged.

What is claimed is:

1. A color signal processor comprising:

first oscillating means for generating a signal having a frequency which is an integral multiple of a chrominance signal whose frequency is converted to a low frequency;

dividing means for dividing the signal generated by said first oscillating means into a plurality of signals having phases different from each other by 90°;

a control circuit for generating control signals based on a horizontal sync signal;

selecting means for selecting one of the signals divided by said dividing means in accordance with a control signal generated by said control circuit for controlling whether or not an R-Y axis of said chrominance signal is inverted, and outputting a selected signal;

second oscillating means for generating a color subcarrier;

first multiplying means for multiplying said color subcarrier generated by said second oscillating means with the selected signal outputted from said selecting means to generate a first arithmetic carrier signal when said R-Y axis is not inverted, and for multiplying said color subcarrier by a 180° phase shifted signal output from said selecting means to generate a second arithmetic carrier signal when said R-Y axis is inverted;

extracting means for extracting a first arithmetic carrier signal from a signal outputted from said first multiplying means when said R-Y axis is not inverted, and extracting a second arithmetic carrier signal from a signal outputted from said first multiplying means when said R-Y axis is inverted;

second multiplying means for multiplying one of the first and second arithmetic carrier signals extracted from said extracting means and said chrominance signal; and filter means for removing from the output signal of said second multiplying means an upper side band component, formed of a sum of said color subcarrier and said chrominance signal, and a lower side band component, formed of a difference between said color subcarrier and said chrominance signal.

2. The processor according to claim 1, wherein said extracting means comprising:

a first filter for extracting said first arithmetic carrier signal from the output of said first multiplying means;

a second filter for extracting said second arithmetic carrier signal from the output of said first multiplying means; and a switch for selecting said first arithmetic carrier signal output from said first filter when said R-Y axis is not inverted, and the second arithmetic carrier signal output from said second filter when said R-Y axis is inverted.

3. The processor according to claim 1, further comprising:

a ½ divider for dividing said horizontal sync signal by ½;

a first supplier for supplying an output signal of said ½ divider to said selecting means as said control signal in accordance with an identification signal for identifying a color rotation signal, a PAL format, and NTSC format when said R-Y axis is inverted;

a ¼ divider for dividing said horizontal sync signal by ¼; and second supplier for supplying an output of said ¼ divider to said selecting means as said control signal in accordance with a signal for inverting a polarity of a burst signal when said R-Y axis is inverted.

4. The processor according to claim 1, further comprising:
a comb filter for extracting said chrominance signal from the output signal of said filter means;
first phase shifter for shifting a burst signal of the chrominance signal outputted from said comb filter at −45°;
second phase shifter for shifting a burst signal of the chrominance signal outputted from said comb filter at +45°; and
a second selecting means for selecting an output signal of said comb filter at the time of a PAL special reproduction, an output signal of said first phase shifter at the time of an NTSC→PAL conversion, and an output signal of said second phase shifter at the time of a PAL→NTSC conversion.

5. A color signal processor comprising:
first generating means for generating a first arithmetic carrier signal obtained when an R-Y axis of a chrominance signal whose frequency is converted to a low frequency is not inverted;
second generating means for generating a second arithmetic carrier signal obtained when said R-Y axis is inverted;
selecting means for selecting the first arithmetic carrier signal outputted from said first generating means when said R-Y axis is not inverted, and the second arithmetic carrier signal outputted from said second generating means when said R-Y axis is inverted;
multiplying means for multiplying one of said first and second arithmetic carrier signals selected via said selecting means by said chrominance signal; and
filter means for removing an upper side band component, formed of a sum of a color subcarrier and said chrominance signal, and a lower side band component, formed of a difference between the color subcarrier and said chrominance signal, from the output signal of said multiplying means.

6. The processor according to claim 5, wherein said first generating means comprises:
first oscillating means for generating a signal having a frequency that is an integral multiple of said chrominance signal;
first dividing means for dividing the signal generated by said first oscillating means into a plurality of signals having phases different from each other by 90°; and
second selecting means for selecting one of signal outputted from said first dividing means in accordance with a control signal.

7. The processor according to claim 5, wherein said second generating means comprises:
oscillating means for generating a signal having a frequency that is lower than the frequency of the signal generated by said first generating means;
dividing means for dividing the signal generated by said oscillating means into a plurality of signals having phases different from each other by 90°; and
second selecting means for selecting one of signals outputted from said dividing means in accordance with a control signal.

8. The processor according to claim 5, further comprising:
a comb filter for extending said chrominance signal from the output signal of said filter means;
first phase shifter for shifting a burst signal of said chrominance signal outputted from said comb filter at −45°;
second phase shifter for shifting said burst signal outputted from said comb filter at +45°; and
selecting means for selecting an output signal of said comb filter at the time of a PAL special reproduction, an output signal of said first phase shifter at the time of an NTSC→PAL conversion, and an output signal of said second phase shifter at the time of a PAL→NTSC conversion.

9. A color signal processor comprising:
first oscillating means for generating a signal having a frequency which is an integral multiple of a chrominance signal whose frequency is converted to a low frequency;
dividing means for dividing the signal generated by said first oscillating means to generate a plurality of signals having phases different from each other by 90°;
a control circuit for generating control signals based on a horizontal sync signal;
selecting means for selecting one of the signals divided by said dividing means in accordance with a control signal generated by said control circuit;
second oscillating means for generating first and second color subcarriers having phases which are different from each other by 90°;
first multiplying means for multiplying the first color subcarrier outputted from said second oscillating means by a first signal outputted from said selecting means;
second multiplying means for multiplying the second color subcarrier outputted from said second oscillating means by a second signal having a phase which is different from the phase of said first signal by 90° degrees outputted from said selecting means;
adding means for adding the output of said first multiplying means and the output signal of said second multiplying means to generate a first arithmetic carrier signal when an R-Y axis of said chrominance signal is not inverted;
subtracting means for subtracting the output of said second multiplying means from the output signal of said first multiplying means to generate a second arithmetic carrier signal when said R-Y axis is inverted;
selecting means for selecting the first arithmetic carrier signal outputted from said adding means when said R-Y axis is not inverted, and the second arithmetic carrier signal outputted from said subtracting means when said R-Y axis is inverted;
third multiplying means for multiplying one of the first and second arithmetic carrier signals selected by said selecting means by said chrominance signal; and
filter means for removing from the output signal of said third multiplying means an upper side band component, formed of a sum of the color subcarrier and said chrominance signal, and a lower side band component, formed of a difference between the color subcarrier and said chrominance signal.

10. The processor according to claim 9, further comprising:
a comb filter for extracting said chrominance signal from the output signal of said filter means;
first phase shifter for shifting a burst signal of the chrominance signal outputted from said comb filter at −45°;

second phase shifter for shifting a burst signal of the chrominance signal outputted from said comb filter at +45°; and selecting means for selecting an output signal of said comb filter at the time of a PAL special reproduction, an output signal of said first phase shifting at the time of an NTSC→PAL conversion, and an output signal of said second phase shifting at the time of a PAL→NTSC conversion.

11. A color signal processor comprising:

a converter which outputs a chrominance signal having a frequency converted from a high frequency to a low frequency;

first oscillating means for generating a signal having a frequency which is an integral multiple of said chrominance signal;

dividing means for dividing the signal generated by said first oscillating means into a plurality of signals having phases different from each other by 90°;

a control circuit for generating control signals based on a horizontal sync signal;

selecting means for selecting one of the signals divided by said dividing means in accordance with a control signal generated by said control circuit for indicating whether or not an R-Y axis of said chrominance signal is inverted, and outputting a selected signal;

second oscillating means for generating a color subcarrier;

first multiplying means for multiplying the color subcarrier generated by said second oscillating means by the selected signal outputted from said selecting means to generate a first arithmetic carrier signal when an R-Y axis of said chrominance signal is not inverted, and for multiplying the color subcarrier by a 180° phase shifted signal output from said selecting means to generate a second arithmetic carrier signal when said R-Y axis is inverted;

extracting means for extracting a first arithmetic carrier signal from a signal outputted from said first multiplying means when said R-Y axis is not inverted, and extracting a second arithmetic carrier signal from a signal outputted from said first multiplying means when said R-Y axis is inverted;

said extracting means comprising a filter having a pass band frequency changed in accordance with a band control signal, said filter having a first pass band through which the first arithmetic carrier signal outputted from said first multiplying means is passed, a second pass band through which the second arithmetic carrier signal outputted from said first multiplying means is passed, said first pass band set in accordance with when said band control signal indicates that said R-Y axis is not inverted, and said second pass band set when said band control signal indicates that said R-Y axis is inverted;

second multiplying means for multiplying one of the first and second arithmetic carrier signals extracted from said extracting means by said chrominance signal; and filter means for removing from the output signal of said second multiplying means an upper side band component, formed of a sum of said color subcarrier and said chrominance signal, and a lower side band component, formed of a difference between said color subcarrier and said chrominance signal.

* * * * *